United States Patent Office 3,424,691
Patented Jan. 28, 1969

3,424,691
STABILIZER FOR POLYOLS
Robert A. Newton, Lake Jackson, Tex., assignor to The Dow Chemical Company, Midland, Mich., a corporation of Delaware
No Drawing. Filed Oct. 21, 1965, Ser. No. 500,250
U.S. Cl. 252—188.3                        11 Claims
Int. Cl. C08g 51/58; C08f 45/58

ABSTRACT OF THE DISCLOSURE

The interaction and deterioration of compositions comprising an aliphatic polyol and a halocarbon or halohydrocarbon are inhibited by the presence of a non-terminal alkylene oxide; e.g., 2,3-butylene oxide.

---

This invention relates to stabilizers for aliphatic polyols. These stabilizers inhibit the reaction of polyols with halocarbons and halohydrocarbons and thus inhibit the discoloration, the evolution of gases, and the corrosion of containers by such materials.

Mixtures comprising halocarbons or halohydrocarbons and polyols are of technical importance, especially in the polyurethane industry, and the deterioration of such mixtures is a recognized problem, as is shown, for example, in U.S. Patents 3,155,625 and 3,137,662. A similar problem is encountered with monohydric alcohols instead of polyols (see U.S. Patent 3,085,116). The problem is particularly severe with aminopolyols, especially those made by the oxyalkylation of aliphatic polyamines, as is more fully taught in the first two of the above-cited patents.

While the above problem arises to some extent with a wide variety of halogenated lower aliphatic hydrocarbons, it is of primary importance with those set forth in the above patents, and especially with CFCl$_3$, this being a species that is both widely used and highly susceptible to the above degradation with polyols.

According to the invention, the degradation, discoloration and deleterious reaction of polyols with aliphatic halocarbons and halohydrocarbons can be inhibited and the polyols can be stabilized by the incorporation therein of a small but effective proportion of a non-terminal alkylene oxide; e.g., a compound having the formula

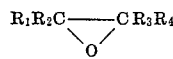

wherein R$_1$ and R$_3$ are lower alkyl radicals containing 1 to about 11 carbon atoms each and R$_2$ and R$_4$ are each H or lower alkyl radicals of the same class as R$_1$ and R$_3$ and wherein the total number of carbon atoms in the compound is from about 4 to about 14. Examples of suitable such oxides include 2,3-butylene oxide, 2,3-amylene oxide, 2-methyl-2,3-butylene oxide, 2,3-dimethyl-2,3-butylene oxide, 2,3- and 3,4-hexene oxides, 2,3-, 3,4- and 4,5-octene oxides, 2,4,4-trimethyl-2,3-amylene oxide, 2,3-, 3,4-, 4,5- and 5,6-dodecene oxide and the like. It is essential that the alkylene oxide be a non-terminal oxide, i.e., R$_1$ and R$_3$ must not be H, since the terminal oxides are ineffective in the invention.

The amount of the oxide required for satisfactory stabilization varies considerably, depending on the particular materials employed and the conditions under which stability is to be maintained. For most materials under ordinary conditions as little as 0.1% by weight, or even less, will provide substantial stabilization. Under severe conditions as much as 2–3% or even 5% may be advantageously used.

The polyols that are stabilized by the alkylene oxides set forth above include substantially any polyol composition that reacts with and deteriorates in the presence of halocarbons or halohydrocarbons. These include the simple glycols, polyoxyalkylene glycols, polyols made by the oxyalkylation of initiators having a multiplicity of reactive hydrogens, such as glycerol, pentaerythritol, sucrose, ethylenediamine, diethylenetriamine, bisphenol A, oxydiphenol, methylenedianiline and the like. Such polyol compositions in combination with halocarbons and halohydrocarbons are widely used in the production of polyurethanes. In such compositions adequate stabilization is obtained by the incorporation therein of a small proportion of the alkylene oxide stabilizers disclosed herein.

A special feature of the invention is the discovery that phenothiazine phenothiozine, itself an effective stabilizer, is synergistically effective in improving the activity of the non-terminal alkylene oxides. The oxide and phenothiazine are suitably used in a ratio of 1:10 to 10:1.

The practice of the invention is illustrated by the following examples.

A polyol formulation that is typical of those used in the polyurethane rigid foam industry was prepared. It comprised 65.6 parts by weight of Voranol RS–375, a commercial product made by condensing propylene oxide with sucrose until the product has an OH equivalent weight of about 150, 3.5 parts of Voranol UI–800, a commercial product made by successively condensing one mole of ethylene oxide and three moles of propylene oxide with one mole of ethylenediamine, and 27.3 parts of CFCl$_3$. Inclusion of conventional catalysts, surfactants or foam regulators and the like in the above formulation made no significant difference in the result in that the stability of the system was improved by the addition of the alkylene oxide stabilizers.

The stability tests consisted of placing 125 g. of the polyol formulation, with or without stabilizer, in a 160 ml. bottle which was then sealed and placed in a water bath at 80–85° C. for 48 hr. Lack of stability was measured by titrating the acidity of the polyol formulation at the end of the test period. For the titration the material was dissolved in anhydrous methanol and titrated with 0.1 N aqueous NaOH. The results of some typical tests are shown in the following table.

| Ex. | Inhibitor, percent by wt. | Temp. of test, °C. | Acidity, micro Eq. per g. |
|---|---|---|---|
| 1 | None | 80 | 16.2 |
| 2 | 2,3-octene oxide, 1.0 | 80 | 9.2 |
| 3 | {2,3-octene oxide, .9 / Phenothiazine, .1} | 80 | 4.0 |
| 4 | Phenothiazine, .1 | 80 | 11.4 |
| 5 | None | 85 | 21.2 |
| 6 | 2,3-butylene oxide, .5 | 85 | 13.2 |
| 7 | 1,2-butylene oxide, .6 | 85 | 21.2 |
| 8 | 1,2-butylene oxide, 1.0 | 85 | 20.2 |

Example 3 shows that although alkylene oxide and phenothiazine are effective stabilizers when used separately, they are unexpectedly and synergistically effective when used in combination. This synergism is observed when the proportions of the two in the mixture are varied widely.

Examples 7 and 8 show the ineffectiveness of terminal alkylene oxides. A similar effect is noted with other terminal oxides as contrasted with the non-terminal oxides used in the present invention.

I claim:
1. A mixture of: (1) a polyol selected from the group consisting of (a) polyoxyalkylene glycol, (b) a polyol made by the oxyalkylation of glycerol, pentaerythritol, sucrose, ethylenediamine, diethylenetriamine, bisphenol A, oxydiphenol or methylenedianiline, or (c) a mixture of such polyols, and (2) a halocarbon or halohydrocarbon, which mixture normally tends to deteriorate because of the interaction of its components, and, as a stabilizer therefor, a small but effective amount of an alkylene oxide which is 2,3-butylene oxide or 2,3-octene oxide.

2. The composition of claim 1 wherein the component (2) is $CFCl_3$.

3. The composition of claim 2 wherein the alkylene oxide is 2,3-butylene oxide.

4. The composition of claim 2 where the alkylene oxide is 2,3-octene oxide.

5. The composition of claim 1 comprising, as a synergistic co-stabilizer, 0.1 to 10 parts by weight of phenothiazine, based on the alkylene oxide.

6. The process for inhibiting the degradation of an aliphatic polyol in the presence of a halocarbon or halohydrocarbon comprising maintaining in said polyol composition, as a stabilizer therefor, a small but effective amount of an alkylene oxide which is 2,3-butylene oxide or 2,3-octene oxide.

7. The process of claim 6 wherein alkylene oxide is 2,3-butylene oxide.

8. The process of claim 6 wherein the alkylene oxide is 2,3-octene oxide.

9. A composition consisting essentially of a mixture of phenothiazine and an alkylene oxide which is 2,3-butylene oxide or 2,3-octene oxide, said composition containing at least 10% by weight of each of said components.

10. The composition of claim 9 wherein the alkylene oxide is 2,3-butylene oxide.

11. The composition of claim 9 wherein the alkylene oxide is 2,3-octylene oxide.

References Cited

UNITED STATES PATENTS

| | | | |
|---|---|---|---|
| 3,214,397 | 10/1965 | Cox | 260—45.8 XR |
| 3,281,379 | 10/1966 | Fontaine et al. | 260—45.8 XR |

LEON D. ROSDOL, *Primary Examiner.*

STANLEY D. SCHWARTZ, *Assistant Examiner.*

U.S. Cl. X.R.

260—2.5, 611.5, 652.5